United States Patent [19]

Primicerio et al.

[11] 3,924,742

[45] Dec. 9, 1975

[54] BOX FOR MAGNETIC TAPE CASSETTE

[75] Inventors: Fernando Primicerio; Paolo Benigno, both of Naples, Italy

[73] Assignee: Minnesota Mining and Manufacturing Co., St. Paul, Minn.

[22] Filed: Feb. 6, 1974

[21] Appl. No.: 439,972

[30] Foreign Application Priority Data

Feb. 6, 1973 Italy .................................. 35568/73

[52] U.S. Cl. ................................ 206/387; 206/809
[51] Int. Cl.$^2$ .................... B65D 85/67; B65D 43/14
[58] Field of Search ............................ 206/387, 809

[56] References Cited

UNITED STATES PATENTS

| | | | |
|---|---|---|---|
| 1,173,388 | 2/1916 | Rosenberg | 206/809 X |
| 3,272,325 | 9/1966 | Schoenmakers | 206/387 |
| 3,754,639 | 8/1973 | Gellert | 206/387 |

FOREIGN PATENTS OR APPLICATIONS

| | | | |
|---|---|---|---|
| 308,165 | 3/1921 | United Kingdom | 206/809 |

*Primary Examiner*—Leonard Summer
*Attorney, Agent, or Firm*—Alexander, Sell, Steldt & DeLaHunt

[57] ABSTRACT

Two-piece cassette box having a receptacle and a cover hinged together centrally to provide a rectangular parallelepiped when the box is closed and a St. Andrew's cross when the box is opened for inserting or extracting a cassette. Each of the two pieces may be a single plastic piece.

2 Claims, 9 Drawing Figures

BOX FOR MAGNETIC TAPE CASSETTE

FIELD OF THE INVENTION

The present invention relates to a box for magnetic tape cassettes and particularly for Philips-type cassettes.

BACKGROUND OF THE INVENTION

Schoenmakers U.S. Pat. No. 3,272,325 shows the box in which the Philips-type cassette is usually marketed. That visually attractive box is inexpensive to make in that it consists of only two molded plastic pieces. The lid of the box is formed with a pouch which lifts the cassette out for easy removal. One disadvantage is that the side wall projections on which the lid is journalled (see reference characters 8*a* and 9*a*) are unsupported and subject to damage.

Some companies have experienced a curious problem in the sale of cassettes in a Schoenmakers box sealed only at the front. The lid can easily be pried out from its hinges, the cassette removed, the hinges reset and the box left as if there had been no pilferage. This problem was solved by sealing the back as well as the front of the box, e.g., in a blister package.

Since nearly all Philips-type cassettes are marketed in the Schoenmakers box, there has been an appetite for an equally attractive, equally inexpensive, equally useful, but different box that would provide a note of distinction. Hopefully, any such different box would be somewhat more rugged than the Schoenmakers box.

THE PRESENT INVENTION

The present invention provides a cassette box which satisfies the aforementioned appetite and also is believed to be more rugged than the Schoenmakers box. Furthermore, a stored cassette cannot be removed without opening the box in the normal way.

Briefly, the box of the present invention comprises a rectangular receptacle and a rectangular cover hinged together to form a rectangular parallelepiped when the box is closed, and a St. Andrew's cross when it is opened to allow the fitting-in and the extraction of a cassette.

THE DRAWING

Figures 1, 2:
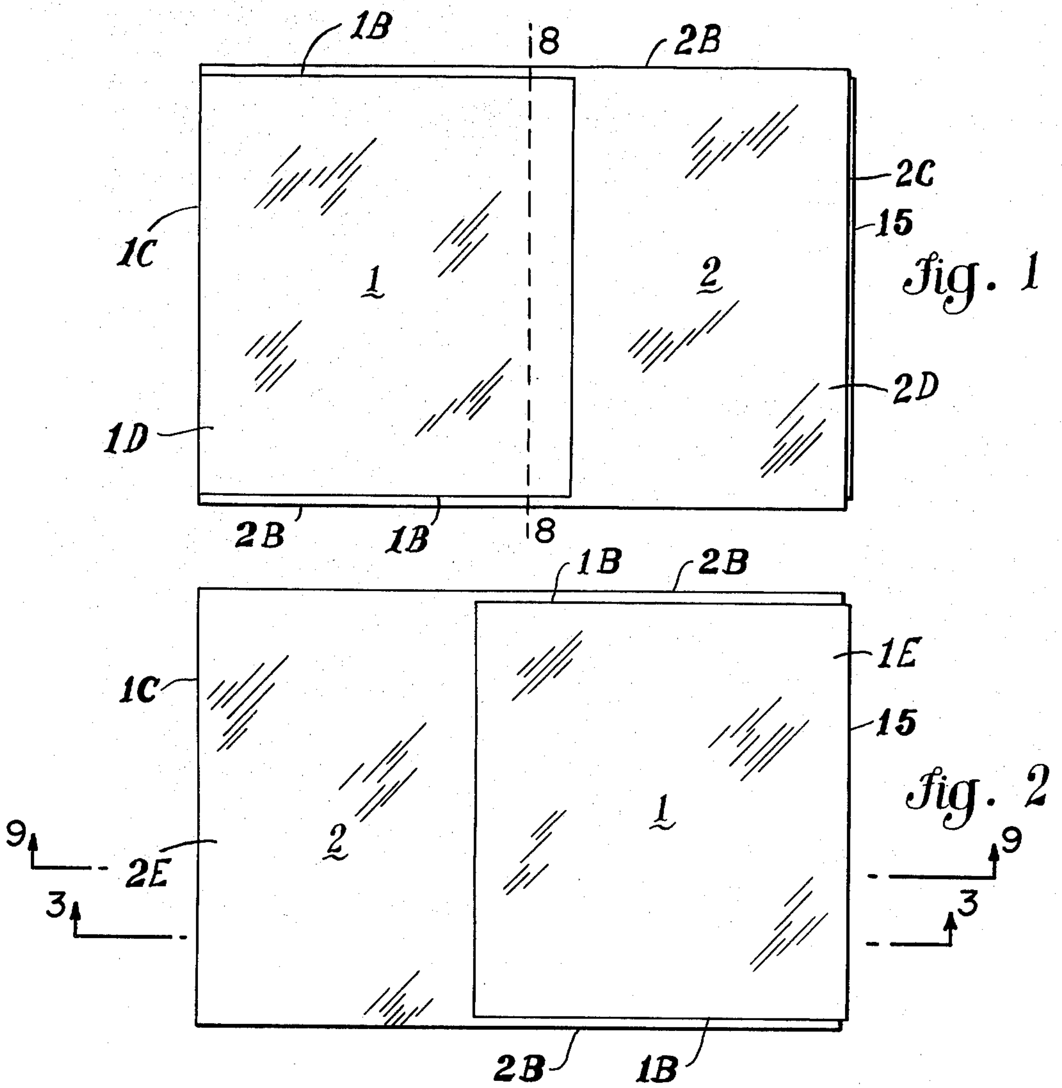
FIG. 1 is a plan of a box of the present invention when it is closed.
FIG. 2 is a plan of the box shown in FIG. 1 from the opposite side.

The box illustrated in the drawings includes a rectangular receptacle 1 and a rectangular cover 2 hinged on the receptacle. The receptacle 1 is formed with a pair of edge walls 1B, one end wall 1C, a partial face wall 1D on one side of the receptacle extending from the end wall 1C to the center of the receptacle, and a partial face wall 1E on the opposite side of the receptacle extending from the center of the receptacle to the open end of the receptacle 1 opposite said one end wall 1C.

Figure 8:
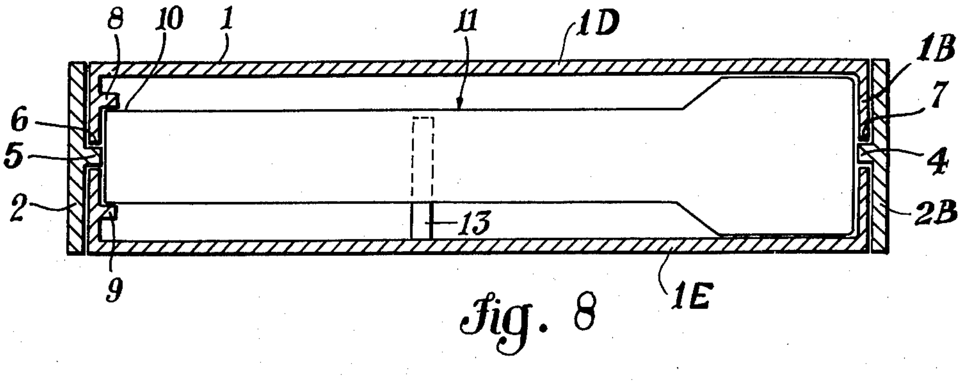
FIG. 8 is a section taken from the 8—8 plane of FIG. 1 with a cassette.
Figure 6:
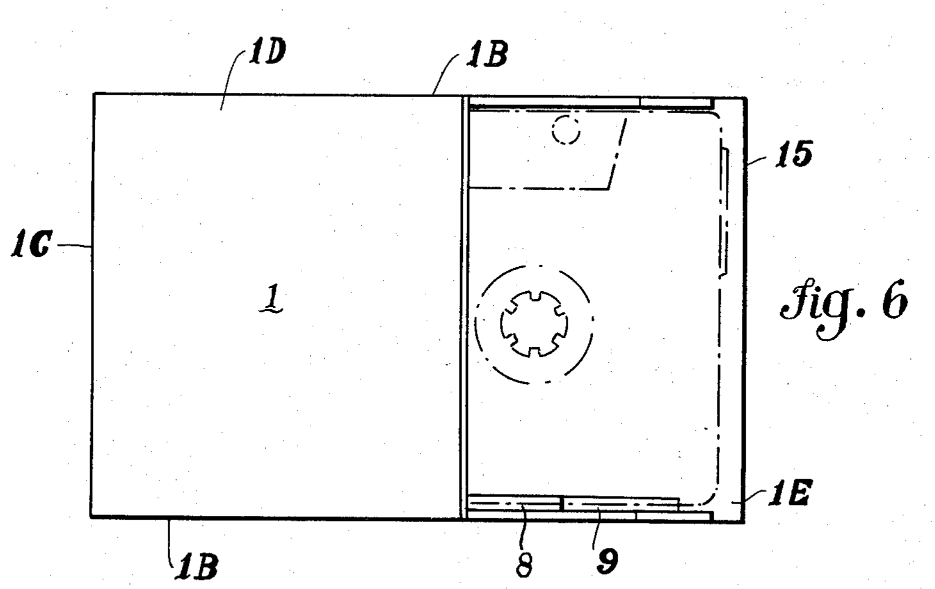
FIG. 6 is a plan of the receptacle portion of the box from the same side as in FIG. 1 together with a stored magnetic tape cassette shown in broken-line outline.

The cover 2 is formed with a pair of edge walls 2B which overlie the edge walls 1B when the box is closed. An end wall 2C of the cover closes the open end of the receptacle 1 when the box is closed. Two partial side walls 2D and 2E abut said partial face walls 1D and 1E, respectively, so that the closed box forms a rectangular parallelepiped. Hinging takes place in the central portion at 3 and includes pins 4, 5 on the edge walls 2B of the cover which fit into corresponding openings 6, 7 formed in the edge walls 1B of the receptacle 1 (FIG. 8).

The partial face wall 1E of the receptacle juts out beyond the edge wall 2C of the cover to provide a lip 15 (FIG. 3) to make the opening of the case easier. One naturally holds the box with the lip upward upon opening the box, and as a consequence, the cassette does not fall out when the box is opened.

Figure 7:
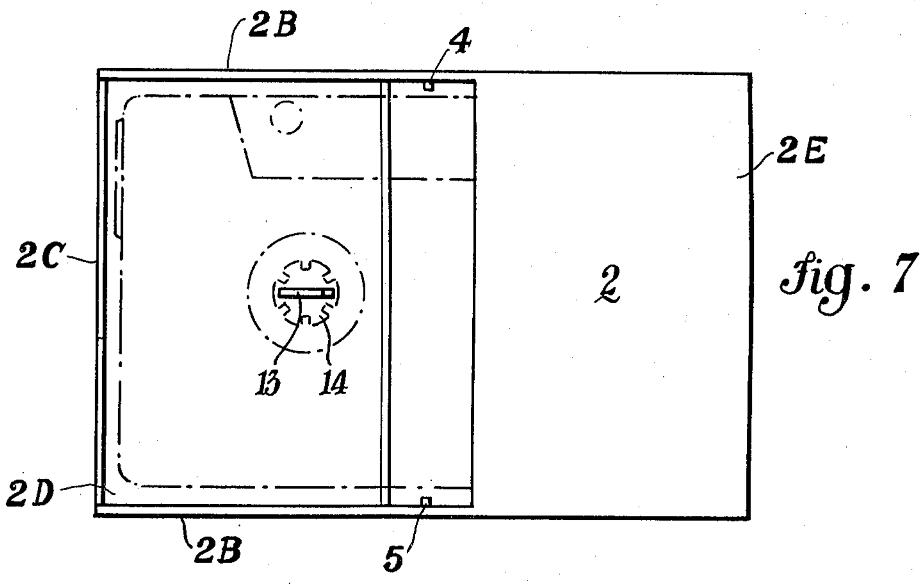
FIG. 7 is a plan of the cover portion of the box from the same side as in FIG. 1 together with a stored magnetic tape cassette shown in broken-line outline.
Figure 9:
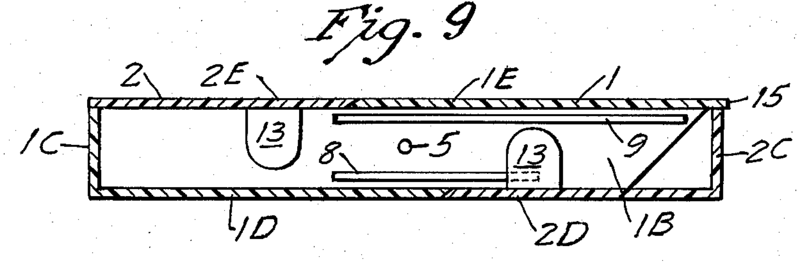
FIG. 9 is a section along 9—9 of FIG. 2.

The inner surface of one of the edge walls 1B is formed with a pair of guides 8, 9 to center and hold the narrow rear edge 10 of a magnetic tape cassette 11. Projecting from the inner-facing surface of each side wall 2D, 2E of the cover is a lug 13. The lugs 13 fit into and lock the reels 14 on which the magnetic tape of the cassette 11 is wound (FIG. 7).

Figure 3:
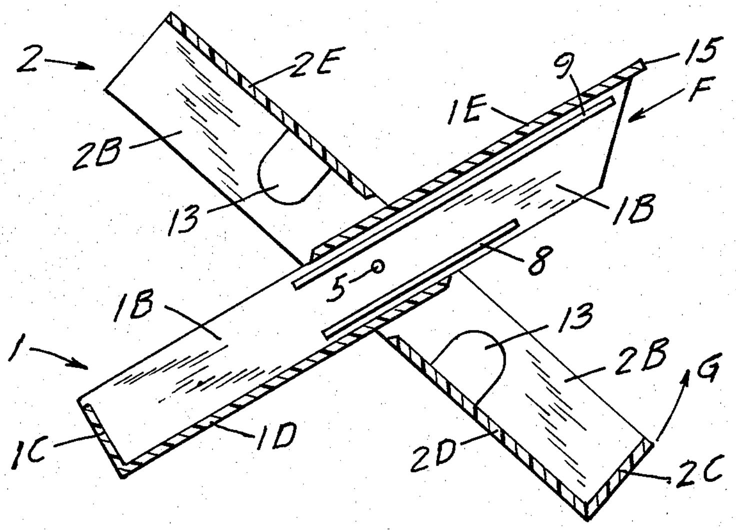
FIG. 3 is a section along 3—3 of FIG. 2 with the box in the open position.
Figure 4:
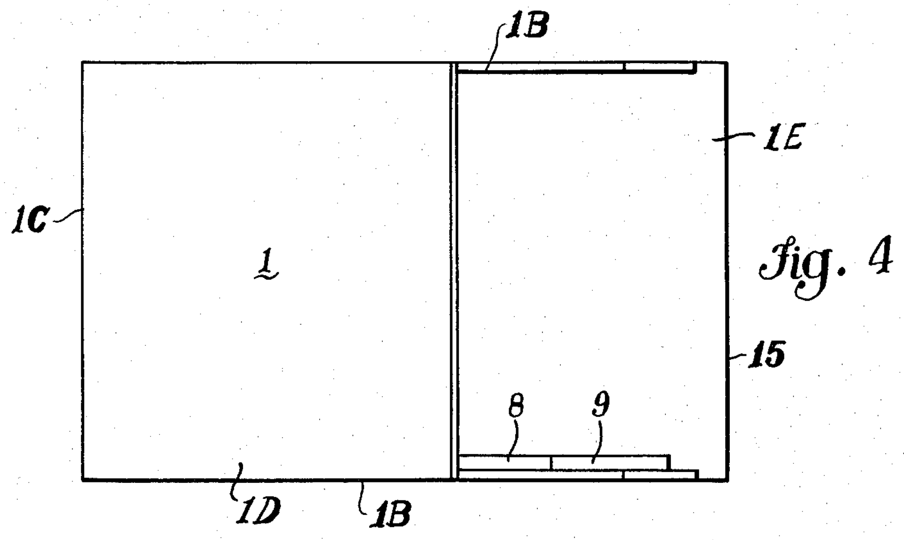
FIG. 4 is a plan of the receptacle portion of the box from the same side as in FIG. 1.
Figure 5:
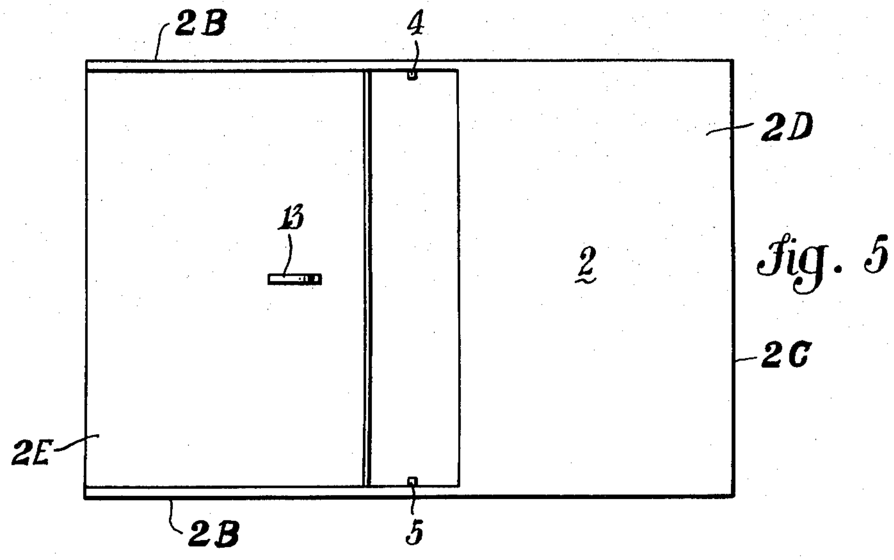
FIG. 5 is a plan of the cover portion of the box from the same side as in FIG. 1.

Referring to FIG. 3, the cassette is loaded in the direction of the arrow F through the open end of the receptacle 1 opposite its end wall 1C. Then the cover 2 is rotated in the direction of the arrow G to close the box.

As is apparent from the drawings, each of the receptacle 1 and cover 2 may be readily molded as a single plastic piece.

We claim:

1. Box for magnetic tape cassette comprising a. a rectangular receptacle formed with
  - a pair of edge walls,
  - one end wall,
  - a partial face wall on one side of the receptacle extending from said end wall to the center of the receptacle, and
  - a partial face wall on the opposite side of the receptacle extending from the center of the receptacle to the open end of the receptacle opposite said one end wall, into which open end a cassette may be inserted, and b. a rectangular cover hinged to the center of the receptacle and having, when the box is closed,
  - a pair of edge walls which overlie the edge walls of the receptacle,
  - an end wall which closes the open end of the receptacle, and two paratial side walls, each of which abuts one of said partial face walls so that the closed box forms a rectangular parallelepiped, and
  - a lug projecting from the inner-facing surface of each side wall of the cover to lock the reels of an inserted cassette when the box is closed.

2. Box as defined in claim 1 wherein the face wall of the receptacle projects beyond the end wall of the cover when the case is closed to provide a lip for easy opening of the box.

* * * * *